US011353396B2

(12) United States Patent
Peng et al.

(10) Patent No.: US 11,353,396 B2
(45) Date of Patent: Jun. 7, 2022

(54) METHOD FOR QUALITATIVE AND QUANTITATIVE DETERMINATION OF KEY SUBSTANCES IN MIXTURE BASED ON TERAHERTZ SPECTRUM

(71) Applicant: University of Shanghai for Science and Technology, Shanghai (CN)

(72) Inventors: Yan Peng, Shanghai (CN); Yiming Zhu, Shanghai (CN); Chenjun Shi, Shanghai (CN); Yujian Yang, Shanghai (CN); Jiayu Zhao, Shanghai (CN); Zhijia Liu, Shanghai (CN); Xinyu Tang, Shanghai (CN); Yang Liu, Shanghai (CN); Lin Guo, Shanghai (CN); Keying Liu, Shanghai (CN); Songlin Zhuang, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 821 days.

(21) Appl. No.: 16/243,315

(22) Filed: Jan. 9, 2019

(65) Prior Publication Data

US 2020/0217790 A1 Jul. 9, 2020

(51) Int. Cl.
*G01N 21/3586* (2014.01)
*G06N 5/04* (2006.01)
*G06N 20/10* (2019.01)

(52) U.S. Cl.
CPC .......... *G01N 21/3586* (2013.01); *G06N 5/04* (2013.01); *G06N 20/10* (2019.01)

(58) Field of Classification Search
CPC ........................ G06N 20/10; G01N 21/3586
(Continued)

(56) References Cited

U.S. PATENT DOCUMENTS

2006/0237650 A1* 10/2006 Taday ................ G01N 21/3581
250/339.11
2008/0060455 A1* 3/2008 Coyle .................. G01N 1/4022
73/863.12
(Continued)

FOREIGN PATENT DOCUMENTS

WO WO-2012059210 A1 * 5/2012 ................ G01J 3/28

OTHER PUBLICATIONS

Yin et al., "Support Vector Machine Applications in Terahertz Pulsed Signals Feature Sets", Dec. 2007, IEEE Sensors Journal, vol. 7, No. 12, pp. 1597-1608. (Year: 2007).*
(Continued)

*Primary Examiner* — Ricky Go

(57) ABSTRACT

Disclosed is a method for qualitative and quantitative determination of key substances in mixture based on terahertz spectrum. Terahertz spectrum of a reference mixture is trained through an SVR algorithm, and predicting parameters of key substances in the mixture to be determined after a model is generated. According to the method, an initial pure spectrum corresponding to each composition in the mixture does not need to be separately determined, no limitation on the number of samples contained in the mixture, and no limitation on frequency range to be determined, and the proportion requirement of the mixture in the early test stage is not limited, and the SVR model does not need to be re-trained after a database is formed in the later stage, and the result can be obtained immediately after the spectrum of item to be determined is introduced into the algorithm model.

1 Claim, 4 Drawing Sheets

(58) Field of Classification Search
USPC .......................................................... 702/23
See application file for complete search history.

(56) References Cited

U.S. PATENT DOCUMENTS

2015/0241340 A1* 8/2015 Kubota .............. G01N 21/3586
250/341.1
2019/0120757 A1* 4/2019 Watanabe .......... G01N 21/3577

OTHER PUBLICATIONS

Xi-Ai et al, "Classification of the green tea varieties based on Support Vector Machines using Terahertz Spectroscopy," May 2011, 2011 IEEE International Instrumentation and Measurement Technology Conference, pp. 1-5. (Year: 2011).*

Liu et al. "Organic Compound Identification Based on Terahertz Spectrum", May 2018, 2018 IEEE 7th Data Driven Control and Learning Systems Conference, pp. 475-480. (Year: 2018).*

* cited by examiner

METHOD FOR QUALITATIVE AND QUANTITATIVE DETERMINATION OF KEY SUBSTANCES IN MIXTURE BASED ON TERAHERTZ SPECTRUM

TECHNICAL FIELD

The disclosure relates to a terahertz spectrum application technology, in particular, to a method for qualitative and quantitative determination of key substances in a mixture based on terahertz spectrum.

BACKGROUND OF THE INVENTION

Terahertz waves are electromagnetic waves with a frequency ranging from 0.1 THz to 10 THz, the wave band thereof lies between the microwave and the infrared. The terahertz waves have a rich scientific significance and a wide application prospect. The energy of a terahertz photon is only a millivolt, and a measured substance would not be damaged due to ionization, and most polar molecules are able to resonate in THz wave band and absorb energy and be detected to obtain a corresponding spectrum, and therefore compared with a traditional destructive chemical detection method, the terahertz spectrum provides a novel effective way for nondestructive detection of substances and recognition of substances.

Due to the fact that the terahertz spectrum has a fingerprint spectrum characteristic, different chemical compositions of a substance have a one-to-one correspondence relationship with wave peak positions in the spectrum, so that the terahertz spectrum can be used for identifying the species of a substance. In addition, when a same substance is in different concentrations, the peak amplitude of the terahertz spectrum thereof can be different, and therefore the concentration of a substance can be determined through the amplitude of the substance.

For the determination of the concentration of key substances in a mixture adopting terahertz waves, a common method is as follows: respectively measuring a individual pure spectrum of all substances in the mixture, then measuring a total mixture spectrum, and then analysis is carried out by combining with a least square method. The method is suitable for the situation that few species of substances are contained in the mixture, but when the species of substances contained in the mixture are large, on the one hand measurement of the individual pure spectrum of all substances is relatively tedious, on the other hand substances in the mixture cannot be accurately determined under many circumstances, and therefore a large error is brought to the final result.

SUMMARY OF THE INVENTION

The present disclosure aims to solve the problem in existing method of terahertz wave determination that long time consumption and low accuracy rate for determining key substances in a mixture with many species of substances, and provides a method for qualitative and quantitative determination of key substances in a mixture based on terahertz spectrum to improve testing efficiency and accuracy rate.

A technical solution of the disclosure provides a method for qualitative and quantitative determination of key substances in a mixture based on terahertz spectrum, the method specifically comprises the following steps:

1) selecting n reference mixture samples containing key substances in a plurality of mixing proportions, and recording an actual concentration of the key substances, scanning n reference mixture samples for multiple times by using a terahertz time domain spectroscopy system, obtaining time domain signals of the reference mixture samples;

2) intercepting a reflection peak for graphic spectrum of each time domain signal obtained in step 1) and performing Fourier transform to convert graphic spectrum of each time domain signal into absorption coefficient frequency spectrum, intercepting a graphic spectrum between effective regions after wavelet transformation, obtaining corresponding frequency spectra of each time domain signal;

3) grouping data of frequency spectra obtained in step 2), one group is training data, and an other group is test data, using frequency spectra of the training data as feature vectors, and establishing a comparison database wherein the feature vectors are in a one-to-one correspondence with known parameters of corresponding reference mixture sample, performing support vector regression SVR model training on each composition of the key substances needing to be determined, finding out a characteristic relation between various parameters of the key substances of this kind of reference mixture sample and the terahertz spectrum, and obtaining a trained SVR model;

4) predicting frequency domain spectra of the test data by using the trained SVR model obtained in step 3), obtaining calculated various parameters of the key substances in the reference mixture sample corresponding to the test data;

5) comparing the calculated various parameters of the key substances in the reference mixture sample corresponding to the test data obtained in step 4) with known parameters corresponding to the test data, verifying accuracy rate of the SVR model obtained in step 3), if the accuracy rate meets requirements, using the SVR model to predict parameters of the key substances selected in step 1); if the accuracy rate does not meet requirements, increasing the number of reference mixture samples, after performing step 1) and step 2) process, re-entering step 3) to perform training, and obtaining an adjusted SVR model, then performing verification: wherein comparing the calculated various parameters of the key substances in the reference mixture sample corresponding to the test data obtained in step 4) with known parameters corresponding to the test data, verifying accuracy rate of the adjusted SVR model obtained in step 3) until the accuracy rate meets requirements, using the adjusted SVR model to predict parameters of the key substances selected in step 1);

to predict is to input the frequency domain spectra of the training data and the actual concentration of each key substance into the SVR model, and establish a correlation between spectral characteristic of frequency domain and the actual concentration of the key substances, and then input the frequency domain spectra of the test data into the SVR model, and SVR model provides qualitative and quantitative information of the key substances.

The disclosure has the beneficial effects that the method for qualitative and quantitative determination of key substances in a mixture based on terahertz spectrum is provided by the present disclosure, and terahertz spectrum of a reference mixture is trained through a support vector regression SVR algorithm, after a model is generated, predicting parameters, such as compositions and concentration, of key substances in the mixture to be determined. According to the method, an initial pure spectrum corresponding to each composition in the mixture does not need to be separately determined, no limitation on the number of the samples contained in the mixture, and no limitation on frequency range to be determined, and the proportion requirement of the mixture in the early test stage is not limited, and the SVR model does not need to be re-trained after a database is formed in the later stage, and the result can be obtained immediately after the spectrum of item to be determined is introduced into the algorithm model. Compared with a commonly used mixture analysis method, the method is more convenient and efficient, and problems that under a circumstance a large number of substances are mixed, the commonly used method takes longer time, and data has relatively large error.

DETAILED DESCRIPTION OF EMBODIMENTS

In this embodiment, taking a terahertz time domain spectroscopy system (referred to as THz-TDS hereinafter) with an effective frequency (detected frequency) from 0.1 to 3.0 THz as an example, accompanying with libsvm toolkit used by computer; in addition, taking the brain glioma as an example, which generally includes L-glutamic acid (alpha-aminoglutaric acid, referred to as L-Glu), norepinephrine (1-(3,4-dihydroxyphenyl)-2-amino ethanol, referred to as NE), naphthylacetic acid (referred to as NAA), cholesterol (5-cholene-3-beta-alcohol, referred to as TC), gamma-aminobutyric acid (referred to as GABA), inositol (referred to as D-MI) and creatine (referred to as CMH) and other substances, and NE, NAA and GABA should be noted.

Figure 4:
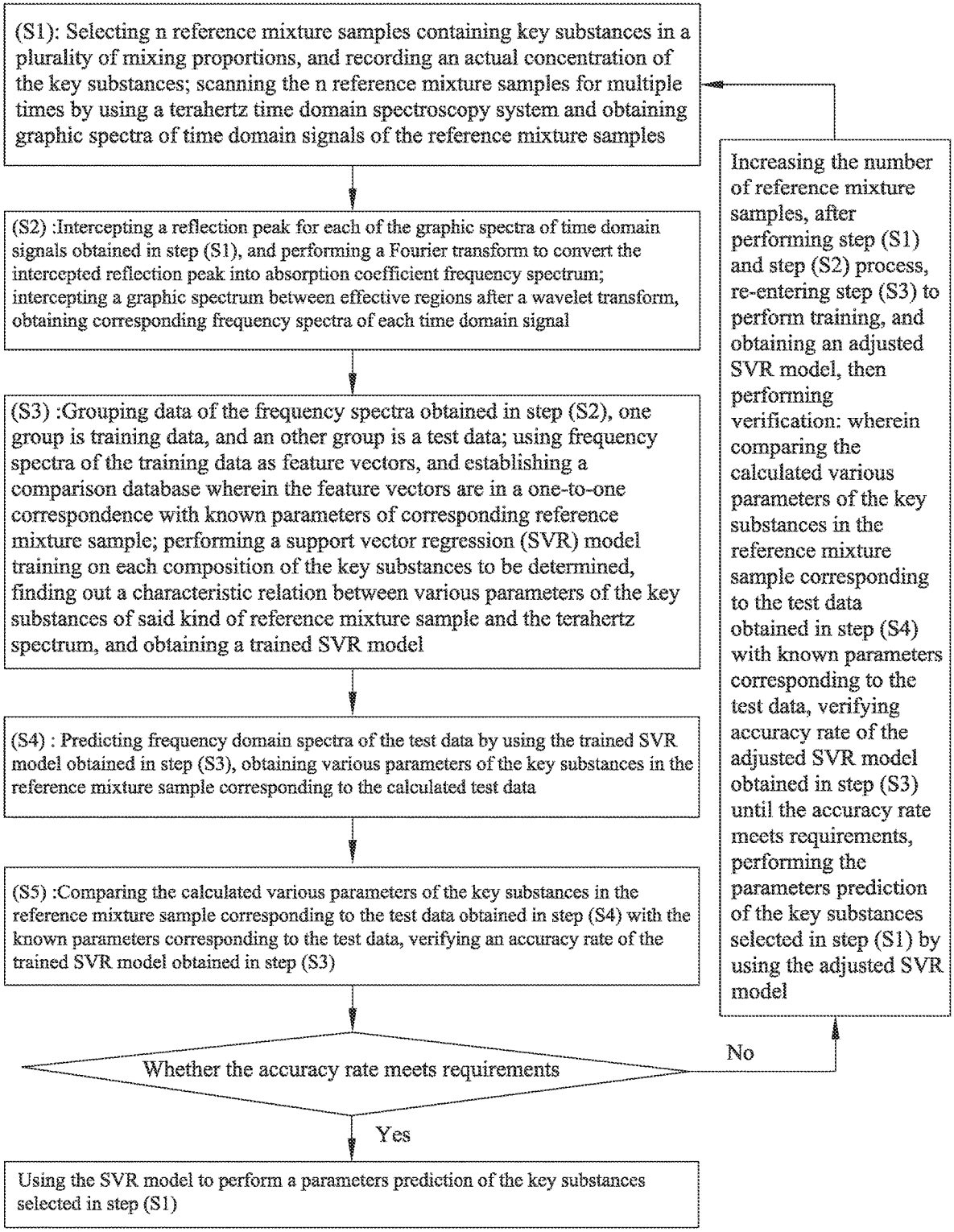
FIG. 4 is a flow chart of a flow chart of a method for qualitative and quantitative determination of key substances in mixture based on terahertz spectrum according to the present disclosure.

As shown in FIG. 4, in the embodiment, a method for quantitative determination of the concentration of key substances in a mixture based on terahertz spectrum comprises the following steps:

Step 1, selecting reference mixture samples containing key substances in a plurality of mixing proportions, and recording the actual concentration of the key substances, scanning each reference mixture sample for multiple times by using a terahertz time domain spectroscopy system, obtaining time domain signals of all reference mixture samples.

In the embodiment, seven substances (L-Glu, NE, NAA, TC, GABA, D-MI and CMH) are mixed in different proportions to 10 kinds of samples, wherein NE, NAA and GABA are recognized as key substances for qualitative and quantitative determination. Each sample is subjected to equal interval scanning for four times by THz-TDS to obtain four sample graphic spectra. Therefore, after all known samples are scanned, 40 time domain signal graphic spectra are obtained. 30 pieces are randomly selected as a training set, and the rest 10 pieces are taken as a test set.

Step 2, intercepting a reflection peak for graphic spectrum of each time domain signal and performing Fourier transform to convert graphic spectrum of each time domain signal into absorption coefficient frequency spectrum, intercepting a graphic spectrum between effective intervals after wavelet transformation, obtaining corresponding frequency spectra of each time domain signal.

In the embodiment, after operations of step 2, equal-interval sampling data of spectrum of effective frequency band is obtained through THz-TDS. Since each sample is subjected to four scans, it can be considered as 40 samples, 10 group are divided, wherein known sample in each group are the same.

Step 3, grouping data of frequency spectra obtained in step 2, one group is training data, and an other group is test data, using frequency spectra of the training data as feature vectors, and establishing a comparison database wherein the feature vectors are in a one-to-one correspondence with known parameters of mixture sample (which can be parameters of one or more substances in the mixture), performing SVR model training on each composition of the key substances needing to be determined, finding out a characteristic relation between various parameters, such as compositions and concentration, of the key substances of this kind of reference mixture sample and the terahertz spectrum, and obtaining a trained SVR model. A SVR algorithm adopted in the embodiment is from a libsvm toolkit.

In the embodiment, the key substances contains three compositions. The spectrum equal-interval sampling data of 30 known reference mixture samples are introduced into the libsvm toolkit as a training set, the training set is used for training SVR model of each composition, to achieve higher precision, selecting optimal penalty parameters and kernel function parameters by adopting a grid searching method, and utilizing optimal parameter training, so as to find out a corresponding relation between parameters, such as compositions and concentration, of the key substances of this kind of mixture sample with the key substances composition and terahertz spectral characteristics, and finally obtaining a parameter model of three compositions.

Step 4, predicting frequency domain spectra of the test data by using the trained SVR model obtained in step 3, obtaining calculated various parameters of the key substances in the reference mixture sample corresponding to the test data.

Step 5, comparing the calculated various parameters, such as compositions and concentration, of the key substances in the reference mixture sample corresponding to the test data obtained in step 4 with known parameters corresponding to the test data, verifying accuracy rate of the SVR model obtained in step 3, if the accuracy rate meets requirements, using the SVR model to predict parameters of the key substances selected in step 1; if the accuracy rate does not meet requirements, increasing the number of reference mixture samples, after performing step 1) and step 2) process, re-entering step 3 to perform training, and obtaining an adjusted SVR model, then performing verification: wherein comparing the calculated various parameters of the key substances in the reference mixture sample corresponding to the test data obtained in step 4 with known parameters corresponding to the test data, verifying accuracy rate of the adjusted SVR model obtained in step 3 until the accuracy rate meets requirements, using the adjusted SVR model to predict parameters of the key substances selected in step 1; and the verified SVR model can be directly used for predicting the frequency spectrum to be determined, and various parameters calculation results, such as compositions and concentration, of the key substances in the sample to be determined are obtained.

Figure 1:
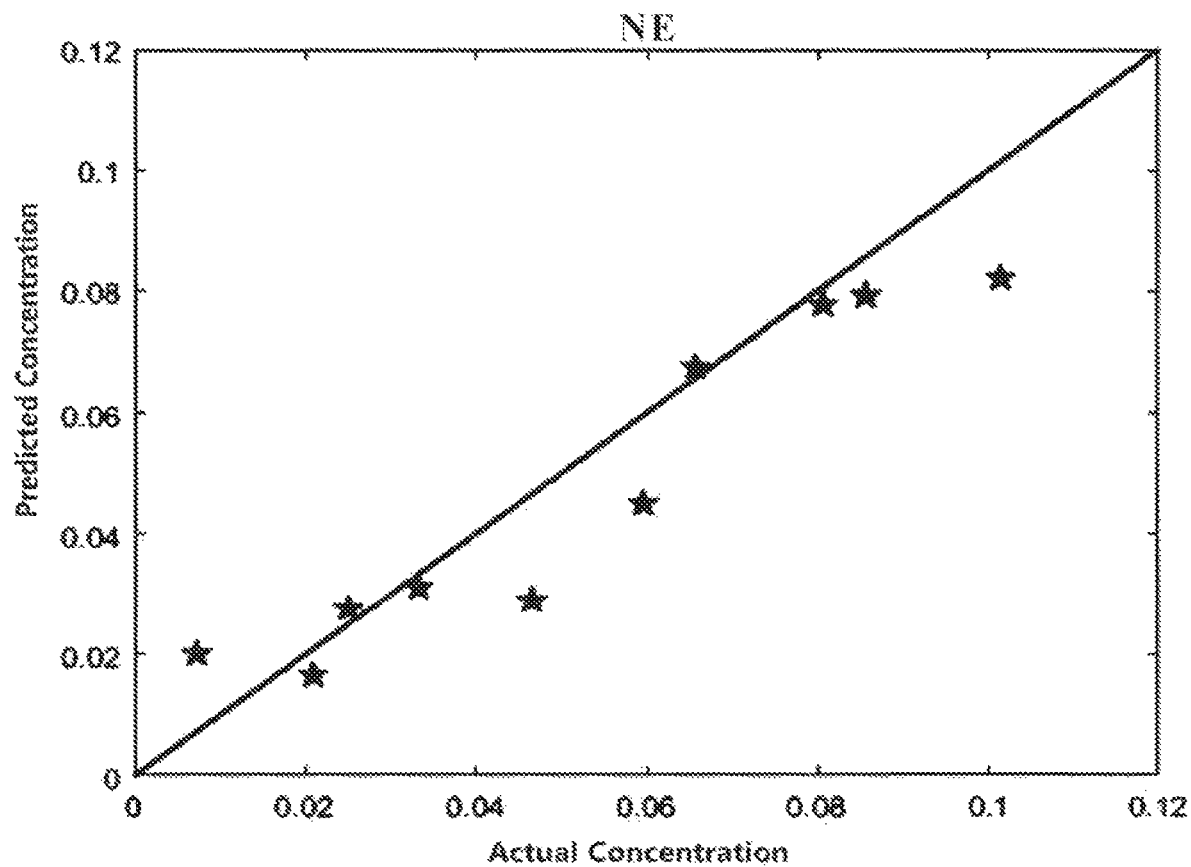
FIG. 1 is a prediction result diagram of the concentration of norepinephrine (NE) in 10 samples to be determined according to the present disclosure.
Figure 2:
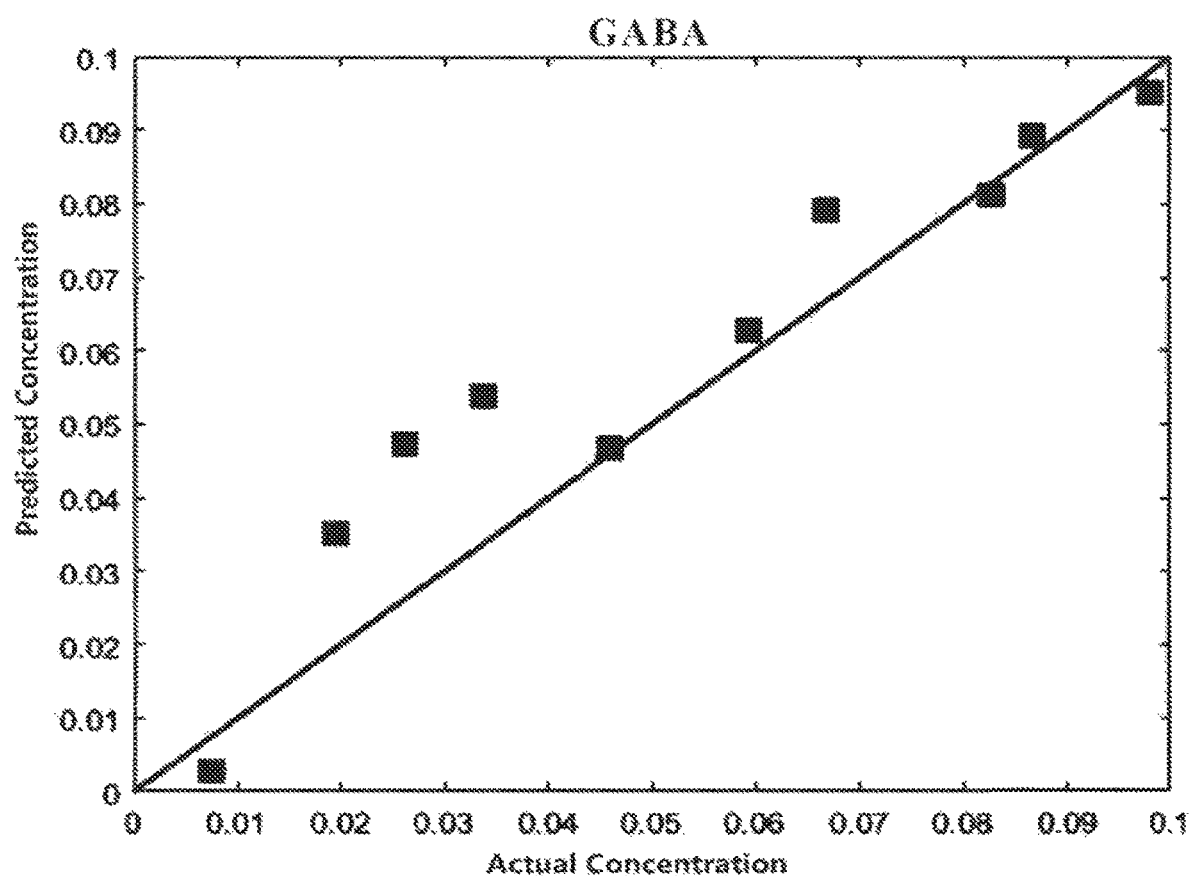
FIG. 2 is a prediction result diagram of the concentration of gamma-aminobutyric acid (GABA) in 10 samples to be determined according to the present disclosure.
Figure 3:
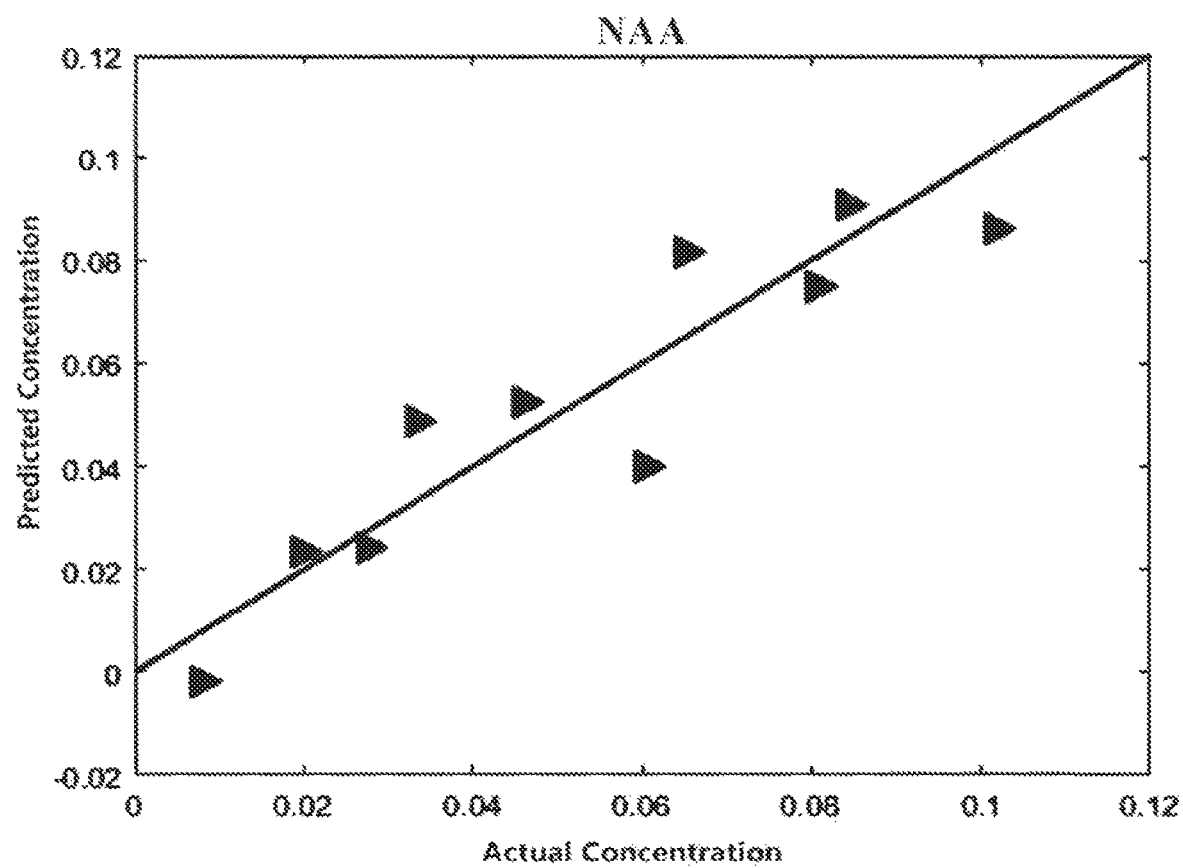
FIG. 3 is a prediction result diagram of the concentration of naphthylacetic acid (NAA) in 10 samples to be determined according to the present disclosure.

Specifically, to predict is to input the frequency domain spectra of the training data and the actual concentration of each key substance into the SVR model, and establish a correlation between spectral characteristic of frequency domain and the actual concentration of the key substances, and then input the frequency domain spectra of the test data into the SVR model, and SVR model provides qualitative and quantitative information of the key substances. In the embodiment, equal-interval sampling data of spectrum of the rest 10 samples to be tested is used as a test set, which is predicted on the trained SVR model, and the result is shown in FIGS. 1, 2, and 3, wherein a horizontal coordinate is an actual concentration of the composition of the key substances in the mixture, a vertical coordinate is a predicted concentration by the model, and the closer the point to the solid line in the center is, the higher the accuracy is.

In the embodiment, the SVR model generated by training can be analogized to a database containing three key substance compositions, for 10 samples to be determined, a prediction accuracy of NE is 95.25%, a prediction accuracy of GABA is 94.97%, a prediction accuracy of NAA is 91.92%, and a result of samples to be determined can be calculated merely through a database importing new data, so that testing work of pure spectrum is greatly reduced in the early stage, the determination method is simplified, and the application range is wide.

What is claimed is:

1. A method for qualitative and quantitative determination of key substances in mixture based on terahertz spectrum, comprising:
   1) selecting n reference mixture samples containing key substances in a plurality of mixing proportions, and recording an actual concentration of the key substances; scanning the n reference mixture samples for multiple times by using a terahertz time domain spectroscopy system and obtaining graphic spectra of time domain signals of the reference mixture samples;
   2) intercepting a reflection peak for each of the graphic spectra of the time domain signals obtained in step 1), and performing a Fourier transform to convert the intercepted reflection peak into absorption coefficient frequency spectrum; intercepting a graphic spectrum between effective regions after a wavelet transform, obtaining corresponding frequency spectra of each time domain signal;
   3) grouping data of the frequency spectra obtained in step 2), one group is training data, and an other group is a test data; using frequency spectra of the training data as feature vectors, and establishing a comparison database wherein the feature vectors are in a one-to-one correspondence with known parameters of corresponding reference mixture sample; performing a support vector regression (SVR) model training on each composition of the key substances to be determined, finding out a characteristic relation between various parameters of the key substances of said kind of reference mixture sample and the terahertz spectrum, and obtaining a trained SVR model;
   4) predicting frequency domain spectra of the test data by using the trained SVR model obtained in step 3), obtaining various parameters of the key substances in the reference mixture sample corresponding to the calculated test data;
   5) comparing the calculated various parameters of the key substances in the reference mixture sample corresponding to the test data obtained in step 4) with the known parameters corresponding to the test data, verifying an accuracy rate of the trained SVR model obtained in step 3), if the accuracy rate meets requirements, using the SVR model to perform a parameters prediction of the key substances selected in step 1);
   if the accuracy rate does not meet requirements, increasing the number of reference mixture samples, after performing step 1) and step 2) process, re-entering step 3) to perform training, and obtaining an adjusted SVR model, then performing verification: wherein comparing the calculated various parameters of the key substances in the reference mixture sample corresponding to the test data obtained in step 4) with known parameters corresponding to the test data, verifying accuracy rate of the adjusted SVR model obtained in step 3) until the accuracy rate meets requirements, performing the parameters prediction of the key substances selected in step 1) by using the adjusted SVR model;
   wherein the parameters prediction is to input the frequency domain spectra of the training data and the actual concentration of each key substance into the SVR model, and establish a correlation between spectral characteristic of frequency domain and the actual concentration of the key substances, and then input the frequency domain spectra of the test data into the SVR model, and the SVR model provides qualitative and quantitative information of the key substance.

* * * * *